R. Yeilding.
Corn Harvester.
Nº 35907. Patented Jul. 15, 1862.

Sheet 2.
2 Sheets.

Witnesses.

Inventor.
Richard Yeilding

UNITED STATES PATENT OFFICE.

RICHARD YEILDING, OF YPSILANTI, MICHIGAN.

IMPROVEMENT IN CORN-HARVESTERS.

Specification forming part of Letters Patent No. 35,907, dated July 15, 1862.

*To all whom it may concern:*

Be it known that I, RICHARD YEILDING, of Ypsilanti, in the county of Washtenaw and State of Michigan, have invented a new and useful Improvement in Corn-Harvesters; and I do hereby declare that the following is a full, clear, and exact description of the same, reference being had to the accompanying drawings, making part of this specification, in which—

Figure 1:
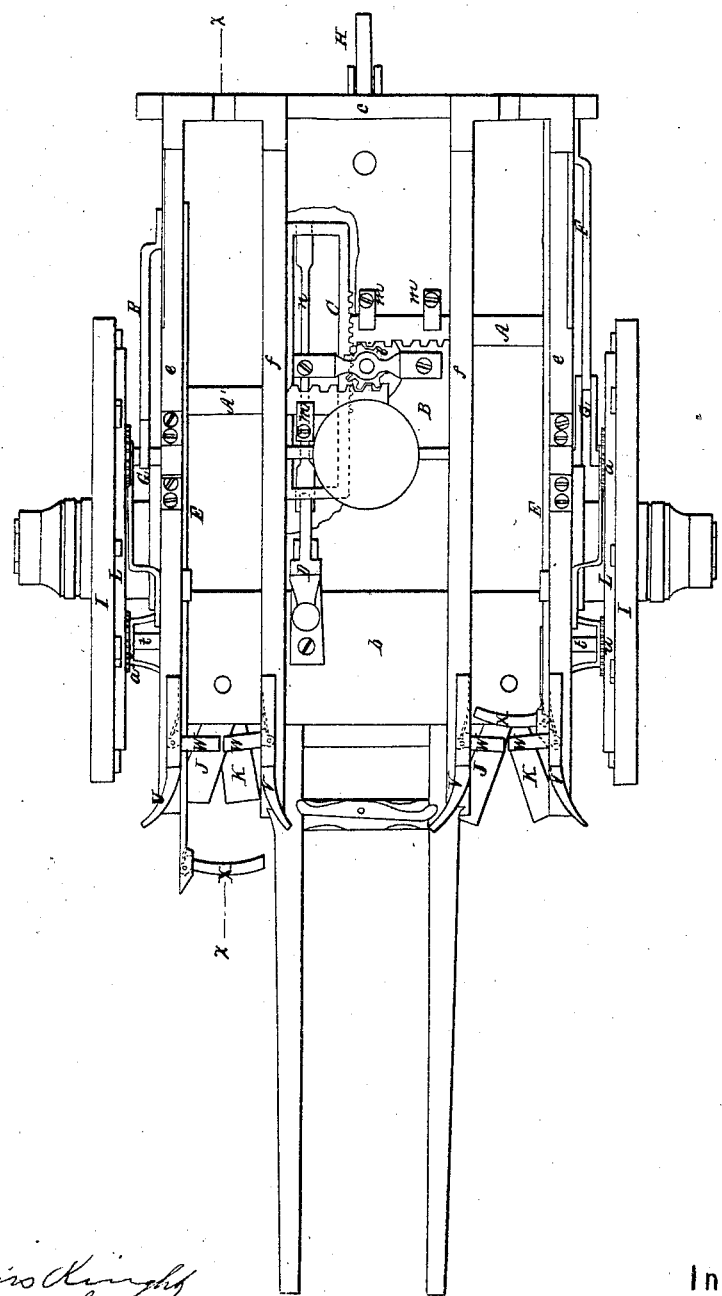
Figure 2:
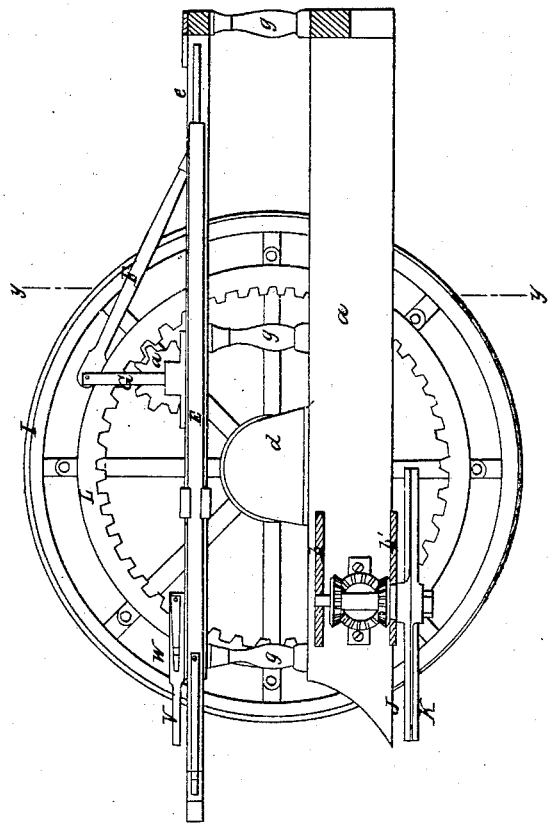
Figure 3:
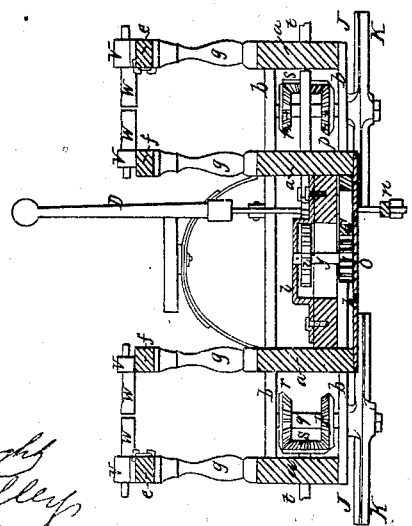

Figure 1 is a plan of a machine embodying my improvement; and Fig. 2 is a vertical longitudinal section of the same, the section being taken in the line $x$ $x$ of Fig. 1. Fig. 3 is a transverse section in the line $y$ $y$ of Fig. 2.

Similar letters of reference indicate corresponding parts in the two figures.

The object of this invention is to obtain a machine of simple construction for harvesting standing corn and depositing the same on the ground in gavels of suitable size in rows parallel with each other, so as to be convenient for loading into a wagon for transportation.

The invention consists in an arrangement for gathering and holding the tops of the stalks when the rotating knives cut them off near the ground.

It also consists in the use of two sliding bars for supporting the cut stalks until a sufficient quantity has been harvested to form a suitable-sized gavel, and then by a simple movement of said bars, imparted to them by means of a hand-lever within the reach of the driver, depositing the gavels on the ground in parallel rows, all as will be hereinafter explained.

To enable others skilled in the art to fully understand and use my invention, I will proceed to describe its construction and operation.

The frame on which the working parts of the machine are arranged is composed of scantling or pieces of timber $a$ of suitable lengths, united together at their front ends, respectively, by two boards, $b$ $b'$, and end piece, $c$, the former being mortised into the top and bottom sides, respectively, of the scantlings $a$, and the latter secured to their back ends by mortise-and-tenon joints. The frame thus constructed at the back end rests on a caster-wheel, H, and near the front end is suspended from the inner ends of the short axles, supported on wheels I I by hangers $d$ $d$ of triangular form, rounded off where they are attached to the axle to conform to the shape of the hubs of the wheels.

$e$ $e$ and $f f$ represent, respectively, pieces of scantling of corresponding length with the frame, and supported on opposite sides thereof on posts $g$ $g$, and together with two transversely-sliding bars, A A', forming racks to receive the stalks as they are cut by the rotating knives. The two sliding bars A A' are fitted to slide through horizontal slots in the central pieces or scantling of the frame, and are actuated by means of a pinion, $i$, placed intermediate between and working into teeth formed on the inner sides of said bars. This pinion, together with another below it, is secured on a short shaft, $j$, which is stepped at bottom in a cavity formed in a bar, $k$, attached to the under side of the central pieces, $a$, and at its upper end runs in a box-bracket, $l$. The sliding bars A A rest on the flooring B, and are kept in gear with the pinion $i$, and guided in their movement by clips $m$, screwed to the flooring. A gear-rack, C, connected at its back end by a pitman, $n$, to the short end of a fulcrumed hand-lever, D, and meshing into the teeth of the pinion $o$, enables the driver while in his seat to simultaneously move the bars A A' inward or outward, as may be desired, to support the cut stalks or to deposit them on the ground.

The cutting apparatus, which is the same on both sides of the machine, consists of two knife-blades, J K, of equal length, chamfered on opposite edges from the center, and arranged so as to have their cutting-edges move in close proximity. The top knife is keyed in the center on the hub of a bevel-pin, $p$, which is fitted loosely on the shaft $q$, which has the bottom knife secured on its lower end. This shaft near its upper end is provided with a bevel-pinion, $r$, and a shoulder, which latter rests on the inner face of the pinion $p$, the outer face of which, resting on the top of the board $b'$, or it may be on a box attached thereto, supports the pinions $p$ $r$ in their proper positions, and the faces of the knives in close proximity to each other. An intermediate gear-wheel, $s$, meshing into the pinions $p$ $r$ and receiving motion from the traction-wheel, imparts rotary motion to the knives in contrary directions. This intermediate gear-wheel is secured on the inner end of a horizontal shaft, $t$, which runs in a box attached to the side of the frame. On the outer end of said shaft is a pinion, $u$, meshing with the teeth of an annular rack, L, secured on the inner face of the traction-wheel and concentric with the periphery thereof. Secured on top, and at the front end of the scantling forming the racks, are outwardly-curved guides V, which have a transverse slot passing through them, in which arms W are pivoted so as to shut up similar to the blade of a common jack-knife. These pivoted arms in their normal condition are opened at right angles to the line of draft of the machine, and are retained in that position by a spring. (Shown in dotted lines in Fig. 1.)

E is a bar provided in its front end with a curved arm, X, pivoted so as to shut up in the same manner as the others before described. The bar E is fitted to slide in a box near its front end and on a pin at its back end. Said pin, projecting laterally from its side, protrudes through a slot made in the outside bar of the rack, and is connected by a pitman, F, to a crank-axle, G, which runs in boxes attached to the frame of the machine, and is actuated by means of the teeth of the annular rack L meshing into the teeth of the pinion $a'$ on the outer end of crank-axle G, imparting a reciprocating motion to the sliding bar. As both sides of the machine are identical, the above description of one side will answer for both. The team is hitched into the shafts, which are attached to the front end of the machine by a bolt passing through the central pieces of the frame.

The machine in passing through the field harvests two rows of corn at once, the horse passing between them. As the team is advanced between the rows, the sliding levers E on each side of the machine are thrust forward by their actuating mechanism, the pivoted arm coming in contact with the stalk, and, being resisted thereby, shuts up until the bar is passed far enough in advance to allow the bar to slip behind the stalk, when the bar commences to move in the opposite direction, and, by means of the curved arm, drawing the top of the stalk between the pivoted bars on the inner side sufficiently to allow them to slip by, when they open and hold the stalk from being pushed forward by the action of the knives in cutting. After being clipped off, the stalks fall over backward into the rack onto the sliding bars, where they remain until a sufficient quantity has been gathered to form a suitable-sized gavel, when by a movement of the lever in one direction the sliding bars are moved inward, and the gavel allowed to fall to the ground.

Having thus described my invention, what I claim as new, and desire to secure by Letters Patent, is—

1. The combination of the reciprocating sliding bars E and pivoted arms X with the pivoted arms W, and rotating knives J K, arranged to operate in the manner and for the purpose set forth.

2. The sliding bars A A', pinions $i$ $o$, rack C, pitman $n$, and hand-lever D, when combined and arranged to operate in the manner and for the purpose set forth.

The above specification of my improvement in corn-harvesters signed this 14th day of February, 1861.

RICHARD YEILDING.

Witnesses:
  OCTAVIUS KNIGHT,
  JAMES H. GRIDLEY.